United States Patent
Kaltenbach et al.

(10) Patent No.: US 7,742,193 B2
(45) Date of Patent: *Jun. 22, 2010

(54) METHOD FOR INSPECTING PRINTS IDENTIFYING DIFFERENCES EXCEEDING A THRESHOLD

(75) Inventors: Thomas F. Kaltenbach, Webster, NY (US); Otto Meijer, Wolcott, NY (US)

(73) Assignee: Eastman Kodak Company, Rochester, NY (US)

( * ) Notice: Subject to any disclaimer, the term of this patent is extended or adjusted under 35 U.S.C. 154(b) by 806 days.

This patent is subject to a terminal disclaimer.

(21) Appl. No.: 11/536,997

(22) Filed: Oct. 30, 2006

(65) Prior Publication Data
US 2007/0047031 A1 Mar. 1, 2007

Related U.S. Application Data

(63) Continuation of application No. 10/178,099, filed on Jun. 24, 2002, now Pat. No. 7,136,191.

(51) Int. Cl.
*H04N 1/40* (2006.01)
*G06K 9/68* (2006.01)
*G06K 15/02* (2006.01)

(52) U.S. Cl. .................. 358/1.9; 358/3.24; 358/406; 382/112; 382/218

(58) Field of Classification Search .............. 358/1.9, 358/3.24, 3.26, 504, 506, 518, 527, 531, 358/406, 487, 448, 461, 463, 302, 530; 382/112, 382/167, 274, 275, 217–219
See application file for complete search history.

(56) References Cited

U.S. PATENT DOCUMENTS 4,467,364 A * 8/1984 Konagaya .................. 358/406
4,800,511 A 1/1989 Tanaka
4,816,681 A 3/1989 Shimura
4,858,018 A 8/1989 Tanaka
4,888,812 A 12/1989 Dinan et al.
5,027,196 A 6/1991 Ono et al.
5,028,781 A 7/1991 Shimura et al.
5,048,110 A 9/1991 Nakajima
5,049,746 A 9/1991 Ito
5,231,385 A 7/1993 Gengler et al.
5,850,487 A 12/1998 Takane et al.
5,937,104 A 8/1999 Henderson et al.
5,982,915 A 11/1999 Doi et al.
5,986,771 A 11/1999 Henderson et al.

(Continued)

*Primary Examiner*—Scott A Rogers
(74) *Attorney, Agent, or Firm*—Donne P. Suchy; David A. Novais; Eugene I. Shkurko

(57) ABSTRACT

The present invention relates to an automatic print inspection method in which photographic prints are scanned to obtain digitized images. The scanned digitized image of the photographic print is compared to digital image data which represents the original captured image. The resulting digital correction data indicates whether or not there are defects in the print media or faults in the printer process, including the digitizing steps. Signal processing transformations may be used to decide how to separate media defects from processing faults and how to correct for the latter. The method of the present invention can be used as a final quality check so that any defective prints can be rejected and remade before orders go out to a customer.

18 Claims, 5 Drawing Sheets

U.S. PATENT DOCUMENTS

| | | | |
|---|---|---|---|
| 5,995,682 A | 11/1999 | Pawlicki et al. | |
| 6,018,362 A | 1/2000 | Suzuki et al. | |
| 6,069,707 A | 5/2000 | Pekelman | |
| 6,185,007 B1 * | 2/2001 | Hayashi et al. | 358/1.9 |
| 6,734,997 B2 * | 5/2004 | Lin | 358/487 |
| 6,900,911 B1 * | 5/2005 | Yamazaki | 358/3.26 |
| 7,136,199 B2 | 11/2006 | Cantwell | |
| 7,239,738 B2 * | 7/2007 | Yasukawa et al. | 382/141 |
| 2003/0179398 A1 * | 9/2003 | Takano et al. | 358/1.9 |
| 2003/0234960 A1 * | 12/2003 | Kaltenbach et al. | 358/3.24 |
| 2006/0203309 A1 * | 9/2006 | Hirayama | 358/504 |

* cited by examiner

METHOD FOR INSPECTING PRINTS IDENTIFYING DIFFERENCES EXCEEDING A THRESHOLD

CROSS REFERENCE TO RELATED APPLICATIONS

This is a Continuation of Utility patent application Ser. No. 10/178,099, filed on Jun. 24, 2002, now U.S. Pat. No. 7,316,191, entitled "A METHOD FOR INSPECTING PRINTS", which is hereby incorporated by reference herein assigned to the Eastman Kodak Company.

FIELD OF THE INVENTION

The present invention relates to an automatic method of inspecting a finished print such as a photographic print, using digital data representative of an image on the print and digital data representative of the original image.

BACKGROUND OF THE INVENTION

During the manufacture of media such as photographic paper, defects can occur on the media. Manufactured media can be inspected on a master roll before it is slit into finished rolls at a manufacturing site or can be manually inspected at a photofinishing or printing site by inspecting completed prints. It is noted that defects in the media made at manufacture will show up on completed prints in the form of defects in the images, and consequently, these defective prints have to be manually removed and reprinted to provide for a corrected image. The inspection of a master roll at a manufacturing site will detect manufacturing defects, but cannot detect defects that are introduced later in slitting, printing or processing operations. Manual inspection of the finished prints at a photofinishing site may detect the above defects, but it is time consuming and inefficient, and depends on the reliability of an operator.

Conventional digital imaging systems utilize digital data and specifically, digital images on a screen, for the purposes of manipulating the image or blending multiple images. However, conventional digital imaging systems do not provide for an automatic print inspection method which can be utilized as a final product quality check to detect defective finished prints.

SUMMARY OF THE INVENTION

Digital originals are replacing film negatives in commercial print processing. The availability of digital originals affords an opportunity to automate final product inspection.

The present invention provides for a method of inspecting a photographic print which comprises the steps of scanning an exposed photographic film to convert an image captured on the film to first digital image data representative of the captured image; processing the first digital image data for rendering as a first photographic print of the image; printing the captured image as a first photographic print of the image based on the first digital image data; scanning the first photographic print to convert the captured image on the first photographic print to second digital image data representative of the printed captured image; comparing the first digital image data with the second digital image data; identifying differences between the second digital image data and the first digital image data which exceed a predetermined threshold to provide for a correction signal indicative of a required image correction action; reprocessing the first or second digital image data in accordance with at least the correction signal for rendering as a second photographic print of the image; and reprinting the image as a second photographic print based on the reprocessed first or second digital image data.

The present invention further provides for an image inspection method which comprises the steps of processing first digital image data representative of an original image to render the original image as a first print; printing the original image as the first print; scanning the first print to convert the original image on the first print to second digital image data; comparing the second digital image data to the first digital image data; identifying differences between the second digital image data and the first digital image data which exceed a predetermined threshold to provide for a correction signal indicative of a required image correction action; reprocessing the first or second digital image data in accordance with at least the correction signal for rendering as a second The present invention further provides for a method of inspecting a photographic print which comprises the steps of scanning an exposed photographic film to convert an image captured on the film to first digital image data representative of the captured image; processing the first digital image data for rendering as a first photographic print of the image; printing the captured image on media so as to provide for a first photographic print of the image based on the first digital image data; scanning the first photographic print to convert the captured image on the first photographic print to second digital image data representative of the printed captured image; comparing the first digital image data with the second digital image data; identifying differences between the second digital image data and the first digital image data which exceed a predetermined threshold algorithm representative of a defect in the media; reprocessing the first or second digital image data to correct the defect; and reprinting the image as a second photographic print based on the reprocessed first or second digital image data to replace the first photographic print.

The present invention further relates to an image inspection method which comprises the step of processing first digital image data representative of an original image to render the original image as a first photographic print; printing the original image on media as a first photographic print; scanning the first photographic print to convert the original image on the first photographic print to second digital image data; comparing the second digital image data to the first digital image data; identifying differences between the second digital image data and the first digital image data which exceed a predetermined threshold algorithm representative of a defect in the media; reprocessing the first or second digital image data to correct the defect; and reprinting the image as a second photographic print based on the reprocessed first or second digital image data to replace the first photographic print.

The present invention further relates to a method of inspecting a photographic print which comprises the steps of digitally processing first digital image data representative of an original image to render the original image as a first photographic print; printing the original image as a first photographic print; scanning the first photographic print to convert the original image on the first photographic print to second digital image data; comparing the second digital image data to the first digital image data; identifying differences between the second digital image data and the first digital image data which exceed a predetermined threshold representative of an error in the digital processing step; adjusting the digital processing step to compensate for the error; digitally reprocessing the first or second digital image data in accordance with the adjusting step for rendering as a second photographic print of the image; and reprinting the image as a second photographic print based on the reprocessed first or second digital image data.

The present invention further relates to a method of inspecting a photographic print which comprises the steps of digitally processing first digital image data representative of an original image to render the original image as a first photographic print; printing the original image as a first photographic print; scanning the first photographic print to convert the original image on the first photographic print to second digital image data; comparing the second digital image data to the first digital image data; identifying differences between the second digital image data and the first digital image data which exceed a predetermined threshold representative of an error in the printing step; adjusting the printing step to compensate for the error; and reprinting the image as a second photographic print after the adjusting step has been put into effect.

The present invention further relates to a method of inspecting a photographic print which comprises the steps of digitally processing first digital image data representative of an original image to render the original image as a first photographic print; rendering the original image as a latent image; chemically developing the latent image to provide for a first photographic print; scanning the first photographic print to convert the image on the first photographic print to second digital image data; comparing the second digital image data to the first digital image data; identifying differences between the second digital image data and the first digital image data which exceed a predetermined threshold representative of an error in the chemical development step; adjusting the chemical development step to compensate for the error; and reprinting the image as a second photographic print based on the adjustment step.

DETAILED DESCRIPTION OF THE INVENTION

Figure 1:
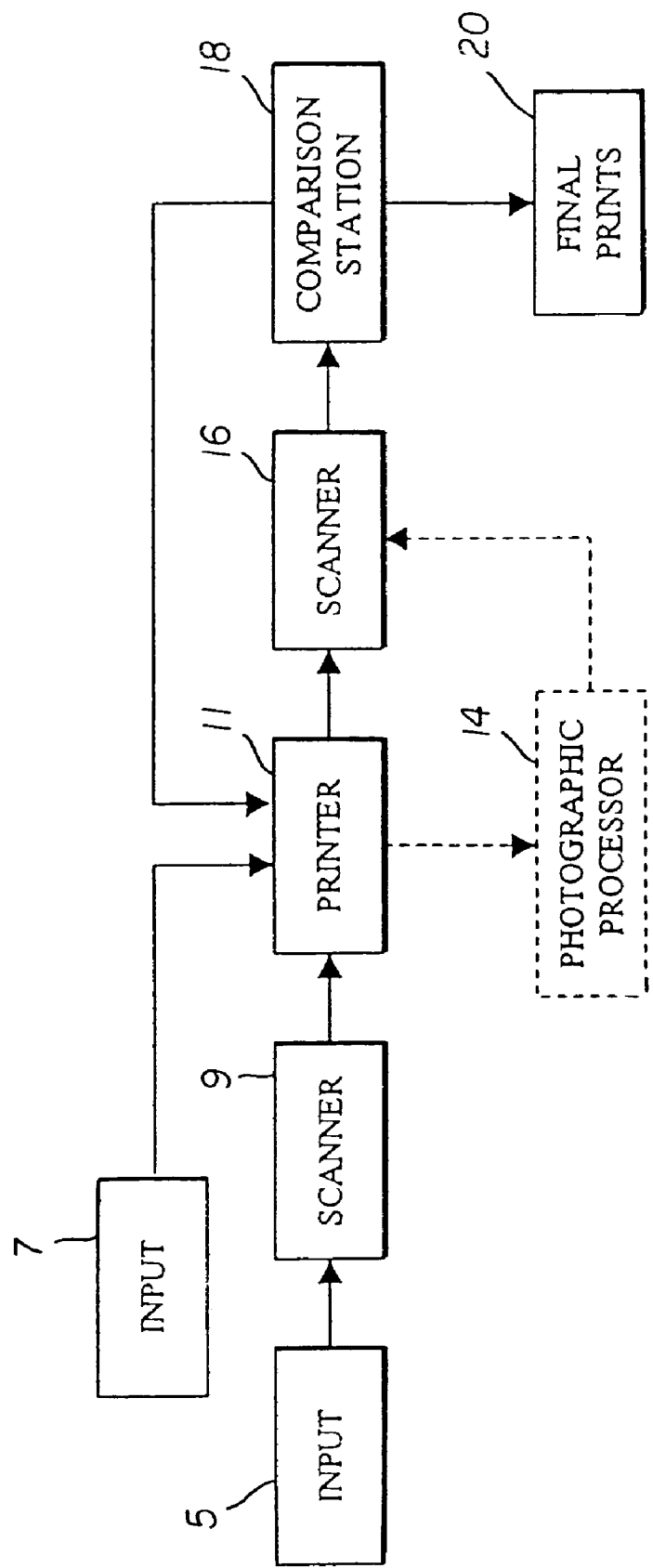
FIG. 1 schematically illustrates the system in accordance with the present invention.

Referring now to the drawings, wherein like reference numerals represent identical or corresponding parts throughout the several views, FIG. 1 schematically illustrates the overall system in accordance with the system and method of the present invention. As shown in FIG. 1, the method of the present invention can accept at least two inputs. One input can be in the form of, for example, exposed film and is represented by reference numeral 5. For a film input, the film is supplied to a scanner 9 which scans the exposed original images on the film to create first digital image data representative of the original image on the film. A printer 11 can include software to process the first digital image data for rendering as a first photographic print. Of course, the present invention is not limited to the printer having software as noted above and the software can be provided within scanner 9 as opposed to printer 11.

As also shown in FIG. 1, the input could be in the form of a digital input represented by numeral 7. The digital image would represent an original captured image and is defined as the first digital image data. In this case, the first digital image data is provided directly to printer 11, where the first digital image data is processed to render the first digital image data as a first photographic print representative of the original image.

Regardless of whether the input is film (ref. No. 5) or digital (ref. No. 7), after the first photographic print is created and printed by printer 11, the first photographic print is scanned by way of a second scanner 16 or conveyed back to first scanner 9 to scan the first photographic print. More specifically, in the method of the present invention, there is a scan of the first photographic print which is created based on the first digital image data that is either provided via input 5 or input 7. This scan of the first photographic print provides for second digital image data representative of the scanned photographic print.

As a further option, in the event that printer 11 is part of a silver halide system, the first digital image data is provided as a latent image onto photographic paper, and the photographic paper goes through a chemical or photographic processor 14 for processing and development of the image to create the first photographic print. After processing, the first photographic print is scanned by scanner 16 or optionally scanner 9 to provide for the second digital image data.

In a method of the present invention, the first digital image data is representative of the original input data, and the second digital image data is representative of the scanned first photographic print. The first digital image data and the second digital image data are then compared to each other at a comparison station 18. Comparison station 18 could be part of a scanner, printer or stand-alone computer.

Comparison station 18 is adapted to identify differences between the second digital image data and the first digital image data which exceed a predetermined threshold or algorithm to provide for a correction signal indicative of a required image correction action, processing correction action or printing correction action. The nature of the correction signal will determine which correction action needs to be taken. If the correction signal format indicates that an image correction is required, the print is remade by feeding the first digital image data to printer 11. If the correction signal format indicates that a processing or printing correction action is required, this action is applied to printer 11, processor 14 or scanners 9 or 16, after which the first digital image data are reprocessed, rerendered and reprinted. All actions result in the creation of a second photographic or final print 20 to replace the first print.

With respect to the concept of identifying differences which exceed a predetermined threshold or algorithm, these differences can represent defects in the original media or paper which show up on a finished photographic print or operational defects in equipment such as the scanner or printer, which result in the defects on the print. By identifying the differences between the first and second digital image data, the printer or other equipment can be operated to compensate for or correct these differences.

Figure 2:
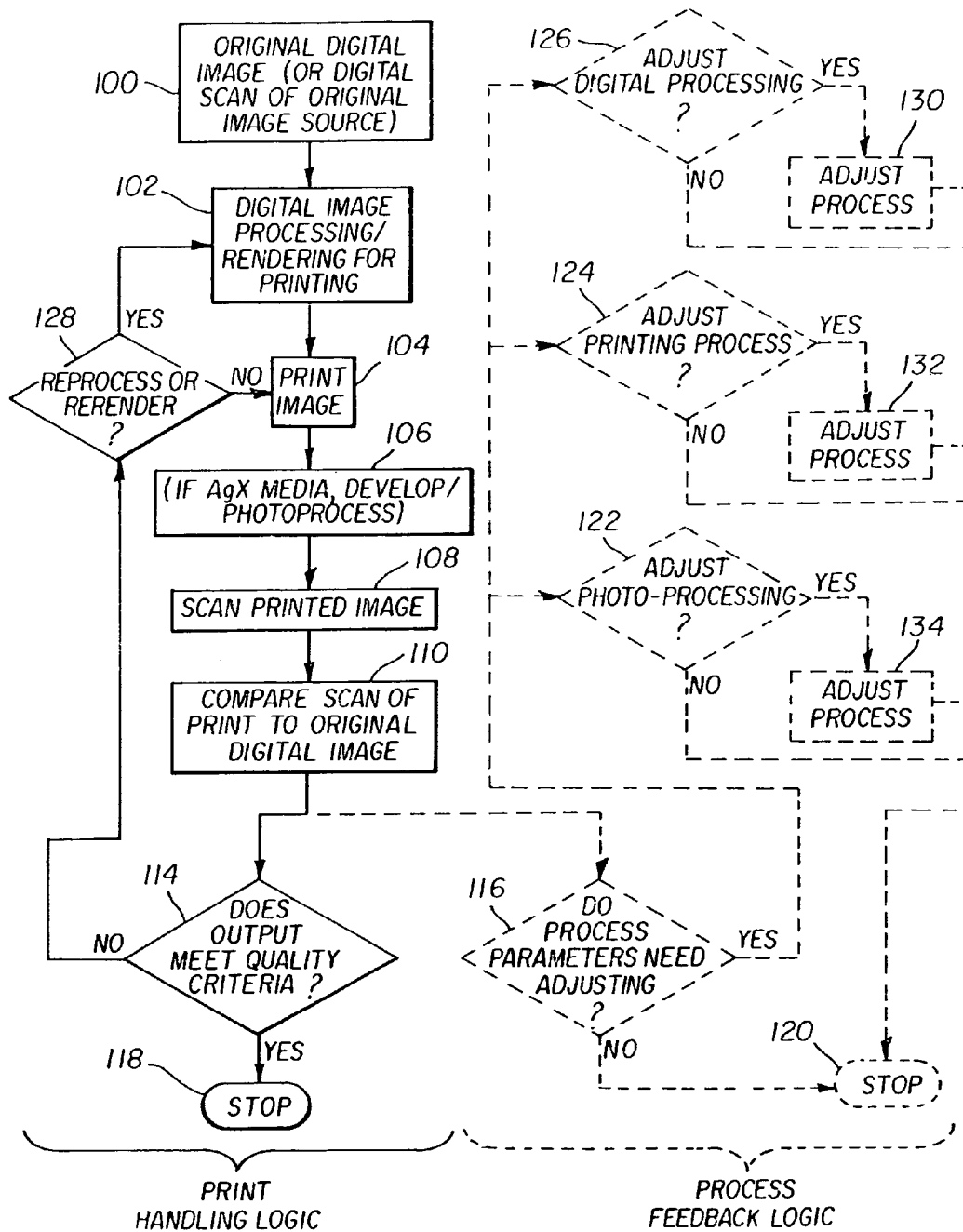
FIG. 2 is a flow chart detailing features of the system and method of the present invention.

With reference to FIG. 2, an overview of the method of the present invention will now be described taking into account the different embodiments of the present invention.

As shown in FIG. 2, the method of the present invention includes an initial step 100 in which an original digital image (input 7) is supplied to printer 11, or a scanned image from film (input 5) is supplied to printer 11. This digital data is defined as first digital image data representative of the original captured image. In step 102, the first digital image data is processed or rendered for printing by way of printer 11. Thereafter, the original captured image represented by the first digital image data is printed (step 104). If the media is silver halide, the image can undergo a development or chemical development process by way of photographic processor 14 (FIG. 1), (step 106).

The result of the above steps is a first photographic print representative of the first digital image data. In step 108, the first photographic print is scanned to provide for second digital image data representative of the scanned photographic print. In step 110, the first digital image data obtained in step 100 is compared with the second digital image data obtained in step 108. If the difference between the first digital image data and the second digital image data is below a predetermined threshold or algorithm, or is within an acceptable range, then the first photographic print is considered acceptable and free of defects. Accordingly, based on this the inspection process would terminate (steps 118 or 120).

More specifically, if the process is concerned with handling of prints, the process would follow a print handling logic procedure and thus, there would be a check to see if the first photographic print meets a specific quality criteria (step 114). This quality criteria would be a comparison between the first digital image data and the second digital image data to determine if the differences exceed a predetermined threshold or are outside of an acceptable range. If they do not exceed a predetermined threshold or are within an acceptable range, then it is determined that the output print does meet a predetermined quality criteria and the process is stopped at step 118. If the differences between the first digital image data and the second digital image data exceed a predetermined threshold or are outside a predetermined range, then it is apparent that the paper or print includes a defect or there is an error in the processing for rendering of the print. In this situation, the answer to step 114 would be no, and the process would proceed to step 128 where it is determined whether it is desired to reprocess or rerender the image in view of the noted defect. If it is desired to reprocess the image, the process proceeds back to step 102 where the first or second digital image data is reprocessed for rerendering as a second photographic print to replace the first photographic print. In reprocessing the first or second digital image data, information with respect to the results of step 114 is taken into account. That is, as a result of step 114, it is determined if any corrective action needs to be taken with respect to the digital image processing in step 102 to compensate for the error or defect. In that regard, the rerendering of the first or second digital image data compensates for the defects found in step 114 for rerendering the first or second digital image data as a second photographic print.

In some cases the defect may simply have been caused by defective media and the process of reprinting the second digital image data on different media corrects the noted defect. Thereafter, the image is printed again as a second photographic print to replace the first photographic print. At this point, the process could end, with the second photographic print replacing the first photographic print. However, if it is desired to be absolutely certain that the second photographic print corrects the errors noted in step 114, the system can proceed as before in that the second photographic print can be scanned to provide for third digital image data representative of the second photographic print. This third digital image data is thereafter compared to the first digital image data, and if the system has worked properly, should provide a yes answer to step 114, for ending the process. Thus, the system and method of the present invention provides for an automatic and efficient way of detecting defects in the media.

When it is desired to use the method of the invention to check the processing equipment and process parameters, the method will include step 116. In this usage, a different set of measures and quality criteria would likely be used to assess gradual changes in the process performance of the digital, printing, and optionally photo-processing steps. The desired result is a feedback mechanism for process control, and subsequent prevention of defects due to deviation from optimal process performance. Therefore, the result of the comparison step 110 can be used as an indication that process parameters such as those in the chemical development process may be responsible for the quality change and needs to be adjusted. That is, if the differences exceed a predetermined threshold or are outside of an acceptable range so as to conclude that the first photographic print does not meet a quality output criteria, the answer to step 116 is yes, and the method proceeds to any of steps 122, 124 or 126 to determine whether any of digital processing step 102, printing step 104 or chemical development process step 106 need to be adjusted to compensate for the quality change discovered in step 116. At that point, the system proceeds to steps 130, 132, and/or 134 to adjust the appropriate processes.

Accordingly, as shown in FIG. 2, the process of the present invention can follow a print handling logic which relates to reprocessing or reprinting to compensate for any defects found in step 114, or a process feedback logic which relates to at least adjusting the chemical development step, the printing step and/or the digital image processing step to compensate for quality changes found in step 116.

Figure 3:
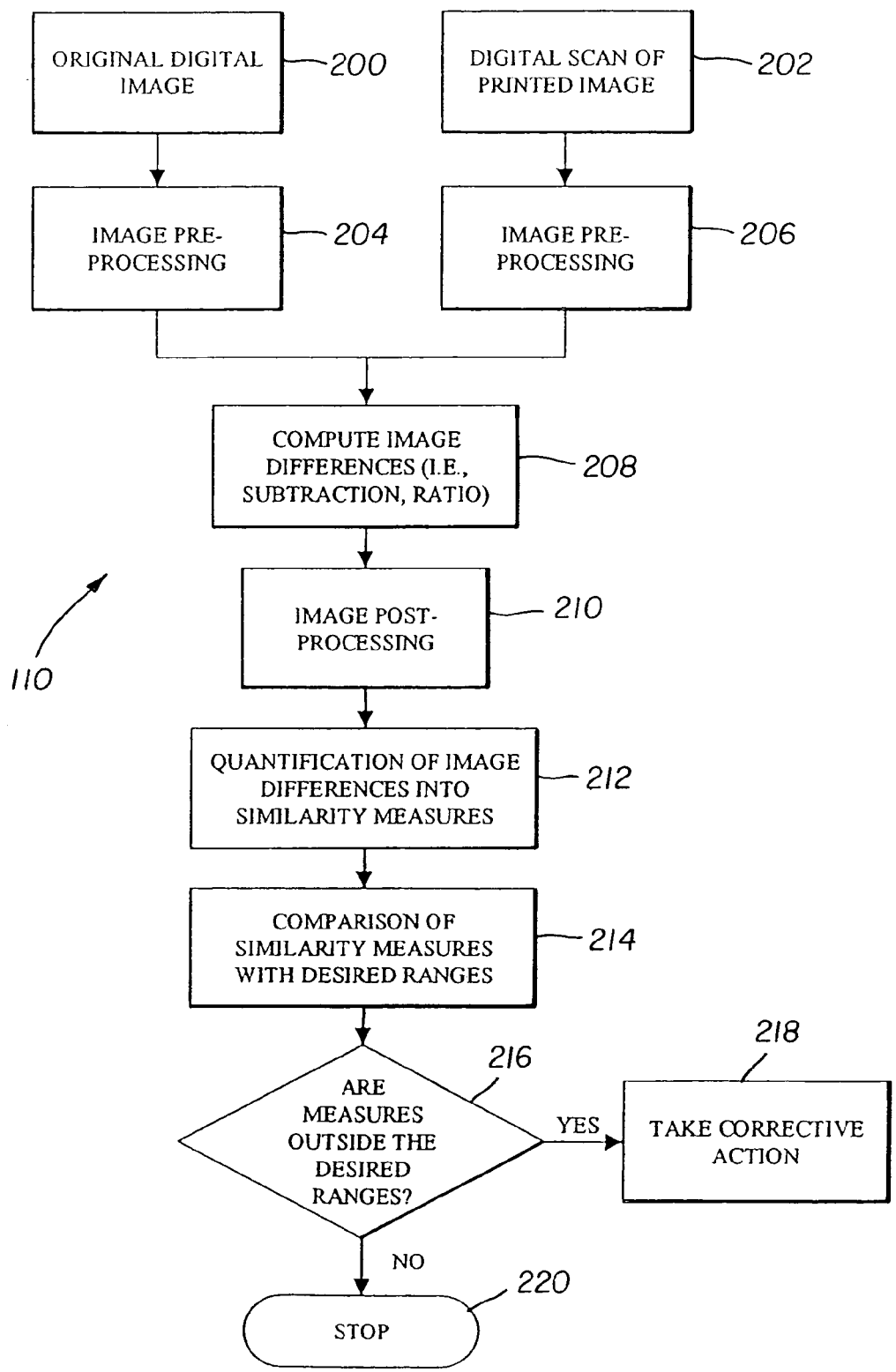
FIG. 3 is a further flow chart detailing the image comparison procedure in accordance with the present invention.

With reference to image comparison step 110 as illustrated in FIG. 2, FIG. 3 shows an example of the type of analysis which can take place. More specifically, as shown in FIG. 3, step 200 represents the first digital image data which is obtained as a result of the original digital image or a digital scan of the original image from the customer. Reference numeral 202 represents the second digital image data which is a result of scanning the first photographic print which includes the original image. At steps 204 and 206, the first digital image data and the second digital image data are processed so as to permit a comparison between the first digital image data and the second digital image data. At step 208, the first digital image data and the second digital image data are compared and as a result, image differences are computed. For example, the comparison could take the form of a subtraction or a ratio analysis. After the differences between the first digital image data and the second digital image data is computed at step 208, an image post processing step (210) occurs for the purposes of preparing the image data for quantification. At step 212, there is a quantification of the image differences into similarity measures, and in step 214, the similarity measures are compared with desired ranges. That is, the desired ranges represent those ranges which provide for a print that meets output quality criteria.

In step 216 it is determined whether these measures are outside the desired ranges or exceed an acceptable threshold. If they are outside the desired ranges or exceed an acceptable threshold, there is a defect in either the media, the equipment, or the processing, and corrective action is taken (step 218). This corrective action could be in the form of a reprint, a reprocess or a rerendering (steps 102 and 104 as noted in FIG. 2), or an adjustment of the digital processing, the printing process or the photoprocessing (steps 126, 124 and 122 of FIG. 2). If the measures are within the desired ranges or below an acceptable threshold, then no further corrective action is needed and the process is terminated (step 220).

With respect to examples of similarity measures that are compared within the context of the present invention, this could be achieved in many forms. First, it is noted that all of the similarity measures which will be described, can be performed on the individual red, green and blue color planes or in some combination of them.

A first similarity measure could be a global/regional measure. In this type of measure, the first digital image data and the second digital image data can be compared with respect to the measurement of their color/density shifts. If the differences between the first digital image data and the second digital image data with respect to color/density shifts are outside a desired range or exceed an acceptable threshold, the feedback to reprocess or rerender could involve instructions to adjust the photoprocessing, the image processing, or printing to compensate for any shifts in color/density. At that point, the appropriate process or processes is/are adjusted and the image is reprinted as a second photographic print to replace the first photographic print. Further examples of global/regional measures include a standard deviation of the pixel values of the image or image regions, a summation of the pixel values of the image or image regions, or a computation of the mean of the image or image regions. More specifically, with respect to the pixel values, the comparing step could take the form of the comparison of pixel values in the first digital image data with corresponding pixel values in the second digital image data. At that point, a deviation between the pixel values in the first digital image data and the corresponding pixel values in the second digital image data which exceed a predetermined amount or are outside of an acceptable range can be identified, and such information can be used to adjust the processing or printing to compensate for the differences.

A further example of a similarity measure includes row/column measures. Under this approach, streaks or scratches can be detected and additionally, printing/raster anomalies, for example, in a laser printing engine, can be measured. The feedback from such a measurement can be used to adjust the scanning or the digitizing of the image, the photoprocessing or the printing. More specifically, if a row/column measurement procedure is used, and the result is such that the measurement is outside of a desired range, it could be an indication that there are streaks or scratches in the first photographic print and therefore, the appropriate process is adjusted and/or the image is reprinted as a second photographic print to compensate for the defect.

Further examples of measurements with respect to row/column measurements could include the standard deviation profile of pixel rows and columns of the image or imager regions; the sum profiles of pixel rows and columns of the image or imager regions; or the mean profiles of pixel rows and columns of the image or imager regions.

A third type of similarity measure involves local/spot measurements. Local/spot measurements enable the detection of localized defects such as manufacturing defects, small scrapes/scratches, spots, etc. If as a result of the measurement process it is determined that the measures are outside a desired range or exceed a predetermined threshold, the feedback to the process could be to adjust the printing and reprint the image. Examples of local/spot measures could involve thresholding the image into a binary image and the use of particle analysis methods to detect and quantify spot defects. This further can be augmented with color or gray scale measures for detected particles.

Figures 4A, 4B, 4C:
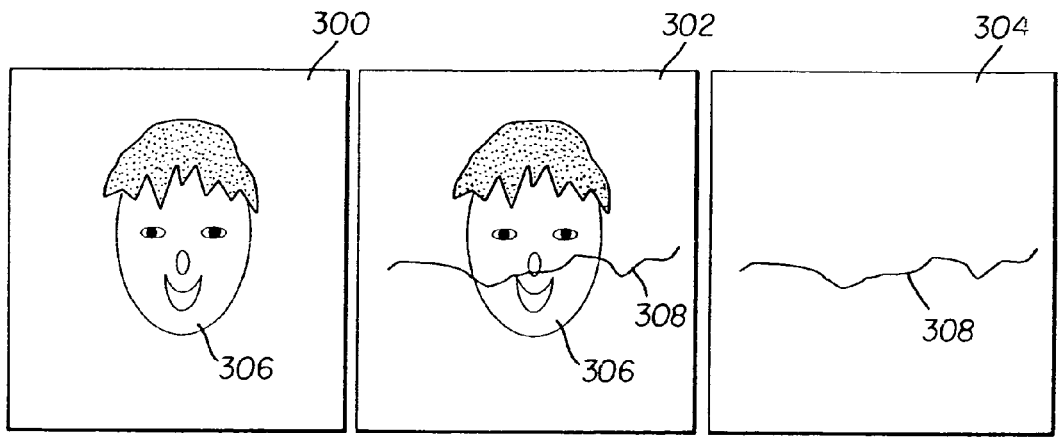
FIGS. 4a-4c schematically illustrate the use of the system and method of the present invention to detect and correct large defects in an image.

FIGS. 4a-4c, 5a-5c and 6a-6c illustrate examples of detected defects and images within the context of the present invention. First with reference to FIG. 4a, an original input 300 with an original image 306 can be provided as an original digital image or scanned from film. The first digital image data as discussed would correspond to original image 306. When original image 306 is printed, a first photographic print 302 including image 306 is provided. As shown in FIG. 4b, photographic print 302 also includes a large defect 308 which may have been caused due to a defect in the media, the processing or the equipment. A scan of photographic print 302 will provide for second digital image data which corresponds to image 306 and defect 308. When the second digital image data is compared with the first digital image data which represents image 306 in FIG. 4a, the difference between the two would provide for image 304 (FIG. 4c) which would include only defect 308. Thus, the process would be adjusted or redone to compensate for defect 308 and remove the same.

Figures 5A, 5B, 5C:
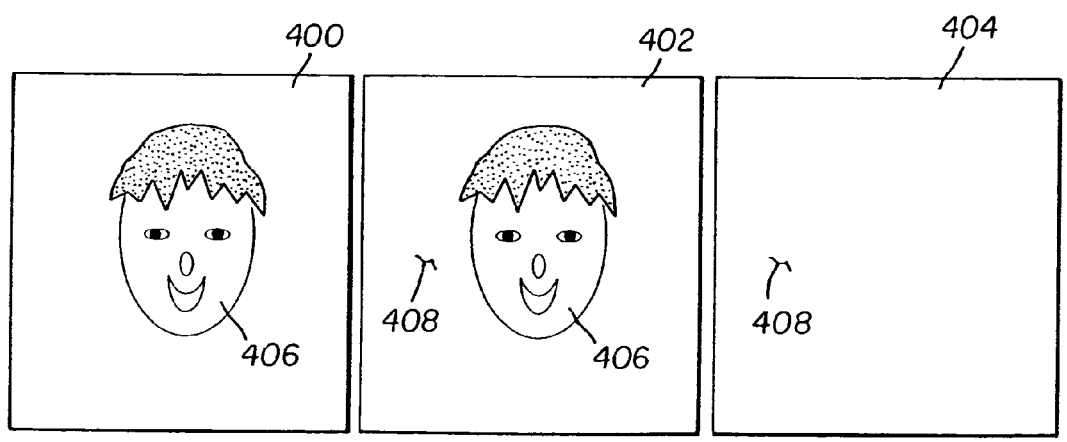
FIGS. 5a-5c illustrate the use of the system and method of the present invention to detect and correct a small defect in an image.

The present invention can also be applied to smaller defects by adjusting the desired range or threshold which the operator will use to detect what is an acceptable print or an unacceptable print. As an example, reference numeral 400 illustrates an original input having image 406. Thus, the first digital image data would correspond to original image 406. Original image 406 is then printed to provide for first photographic print 402. First photographic print 402 as shown in FIG. 5b, includes a small defect 408 which may have been caused by a defect in the media, the processing or the equipment. When first photographic print 402 is scanned, the second digital image data would correspond to image 406 and defect 408. When the second digital image data is compared with the first digital image data, the difference 404 shown in FIG. 5c would be defect 408. With the system of the present invention, the printing and/or processing can be adjusted or redone to correct or compensate for the difference and provide for a second photographic print to replace the first photographic print 402 and eliminate defect 408.

Figures 6A, 6B, 6C:
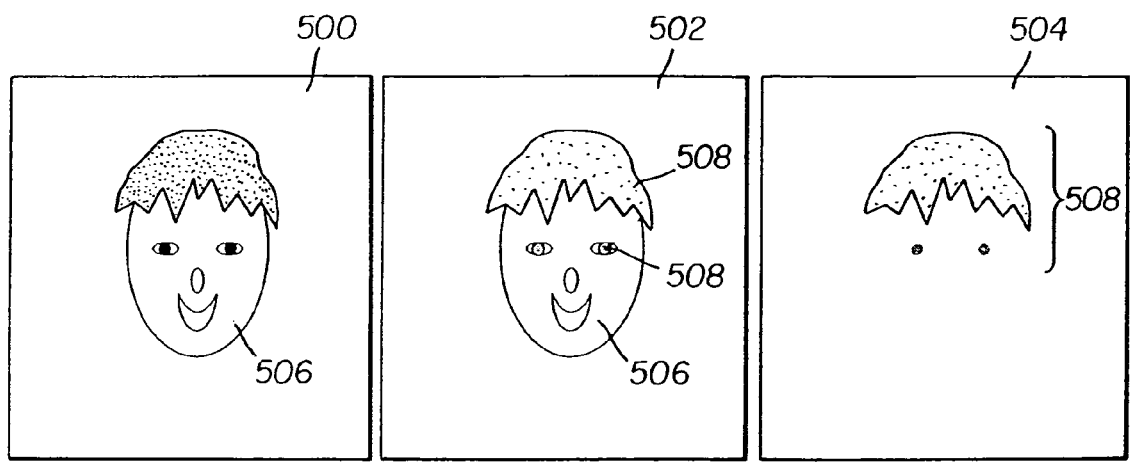
FIGS. 6a-6c is further example of the utilization of the system of the present invention with respect to detecting and correcting a defect in an image.

In FIGS. 6a-6c, it is shown that the method of the present invention can used to correct for color defects. More specifically, reference numeral 500 in FIG. 6a represents an input with an original image 506. Thus, the first digital image data would correspond to image 506. This first digital image data is accordingly printed as a first photographic print 502 (FIG. 6b) having image 508 thereon. Due to a defect in the media, the processing or the equipment, image 508 in first photographic print 502 includes a color which is different from the color of original image 506. This is represented by reference numeral 508. When the first photographic print 502 is scanned, the second digital image data corresponding to the scanned photographic print 502 is compared to the original digital image data or the first digital image data of image 506. The difference 504 is illustrated. At this point, processing can be adjusted or redone to correct or compensate for this defect and provide for a second photographic print to replace the first photographic print.

Therefore, the present invention provides for an automatic method for inspecting photographic finished prints in which the photographic prints are scanned to obtain digitized finished images which are compared with digital data which represent the originally captured image. Using machine vision of the digitized images, the images are compared with each other. Signal processing transformations are thereafter used if necessary to adjust for differences in, for example, illumination type, color gamut, image capture source and other systematic differences between the original image and the scanned image. The automatic inspection method of the present invention can include template matching, where two corresponding digital images are overlayed and any discrepancy between the original and the print can be easily detected.

Other methods may be incorporated to quantify the similarity of the images with respect these discrepancies.

The method of the present invention can be utilized as a final product quality check, so that any defective prints can be rejected and remade before orders go out to a customer. As a consequence of the inspection, any incoming paper imperfections will be caught, faults introduced by the paper finishing operation will be detected, and printer/processing machine performance can be tracked. Benefits of the method of the present invention involves the elimination of human inspection in picture processing, the ability to tolerate some incoming paper defects and the detection of defects caused by the printing process itself. That is, the method of the present invention permits the use of media having minor defects which do not show up in a finished print.

Therefore, with the method of the present invention, it is possible to evaluate the prints for characteristic defects, and it is also possible to monitor and/or control printer functions, such as exposure of color settings, based on the comparison of the digital images. The method also enables an automatic monitoring and/or control of processing chemistry by measuring its effect on a final image, and further, permits the monitoring and/or control of physical defects introduced by the processing. The method of the present invention also enables the monitoring and/or control of physical defects introduced by the printer and also permits the detection of incoming paper defects. The method of the present invention also permits an automatic submission of a reprint order for a print based on finished print quality criteria.

Although the present invention has been described with reference to photographic prints, the invention is not limited thereto. The method of the present invention is also applicable to other imaging and printing fields where it is beneficial to inspect a printed image for defects (for example, medical imaging and large scale printing). In the present invention, original information that is digital or can be converted to digital by scanning or sampling is characterized as an original file. This file gets copied to another media, where it is either already in digital form or can be converted back to a digital file format. This can be characterized as a copied file. The new media and the copying process may introduce alterations to the copied file which make it different from the original file. In accordance with the method of the present invention, these differences can be quantified by digitally comparing the original file with the copied file. This method is applicable to imaging and printing areas where there is a need to quantify how well copies represent the original.

The invention has been described in detail with particular reference to certain preferred embodiments thereof, but it will be understood that variations and modifications can be effected within the spirit and scope of the invention.

The invention claimed is:

1. A method of inspecting a print, the method comprising the steps of:
    representing a captured image as a media print of said image based on said first digital image data;
    scanning the media print using a scanner to convert the captured image on the media print to second digital image data representative of the printed captured image;
    comparing the first digital image data with the second digital image data;
    identifying differences between the second digital image data and the first digital image data which exceed a predetermined threshold to provide for a correction signal indicative of a required image correction action;
    reprocessing the first or second digital image data in accordance with at least said correction signal for rendering as a second print of said image; and
    reprinting said image as a second print based on said reprocessed first or second digital image data.

2. A method according to claim 1, wherein:
    said comparing step comprises comparing pixel values in said first digital image data and corresponding pixel values in said second digital image data; and
    said identifying step comprises identifying a deviation between the pixel values in said first digital image data and the corresponding pixel values in said second digital image data which exceed a predetermined amount.

3. A method according to claim 1, wherein:
    said comparing step comprises comparing pixel rows and columns in said first digital image data with corresponding pixel rows and columns in said second digital image data; and
    said identifying step comprises identifying a deviation between the pixel rows and columns in said first digital image data and the corresponding pixel rows and columns in said second digital image data which exceeds a predetermined amount.

4. A method according to claim 1, wherein:
    said representing, scanning, comparing, identifying, reprocessing and reprinting steps are automated to occur in a substantially continually.

5. A method according to claim 1, wherein:
    said representing, scanning, comparing, identifying, reprocessing and reprinting steps comprise large scale printing.

6. A method according to claim 1, wherein:
    said identifying step comprising external feedback such as remote proofing and operator supplied input.

7. A method of inspecting a print, the method comprising the steps of:
    scanning a first print using a scanner to convert a captured image to a first digital image data representative of the captured image;
    representing the captured image as a media print of said image based on said first digital image data;
    converting the captured image on the media print to second digital image data representative of the captured image;
    comparing the first digital image data with the second digital image data;
    identifying differences between the second digital image data and the first digital image data which exceed a predetermined threshold to provide for a correction signal indicative of a required image correction action;
    reprocessing the first or second digital image data in accordance with at least said correction signal for rendering as a second print of said image; and
    reprinting said image as a second print based on said reprocessed first or second digital image data.

8. A method according to claim 7, wherein:
    said comparing step comprises comparing pixel values in said first digital image data and corresponding pixel values in said second digital image data; and
    said identifying step comprises identifying a deviation between the pixel values in said first digital image data and the corresponding pixel values in said second digital image data which exceed a predetermined amount.

9. A method according to claim 7, wherein:
    said comparing step comprises comparing pixel rows and columns in said first digital image data with corresponding pixel rows and columns in said second digital image data; and said identifying step comprises identifying a deviation between the pixel rows and columns in said first digital image data and the corresponding pixel rows and columns in said second digital image data which exceeds a predetermined amount.

10. A method according to claim 7, wherein:

said representing, scanning, comparing, identifying, reprocessing and reprinting steps are automated to occur in a substantially continually.

11. A method according to claim 7, wherein:

said representing, scanning, comparing, identifying, reprocessing and reprinting steps comprise large scale printing.

12. A method according to claim 7, wherein:

said identifying step comprising external feedback such as remote proofing and operator supplied input.

13. A method of inspecting a print, the method comprising the steps of:

digitally processing first digital image data representative of an original image to render said original image as a first print;

printing said original, image as said first print;

scanning said first print using a scanner to convert the original image on said first print to second digital image data;

comparing said second digital image data to said first digital image data;

identifying differences between the second digital image data and the first digital image data which exceed a predetermined threshold representative of an error in said digital processing step;

adjusting said digital processing step to compensate for said error;

digitally reprocessing the first or second digital image data in accordance with said adjusting step for rendering as a second print of said image; and reprinting said image as a second print based on said reprocessed first or second digital image data.

14. A method according to claim 13, comprising the further step of printing subsequent images based in accordance with adjustments made at said adjustment step.

15. A method of inspecting a print, the method comprising the steps of:

digitally processing first digital image data representative of an original image to render said original image as a first print;

printing said original image as said first print;

scanning said first print using a scanner to convert the original image on said first print to second digital image data;

comparing said second digital image data to said first digital image data;

identifying differences between the second digital image data and the first digital image data which exceed a predetermined threshold representative of an error in said printing step;

adjusting said printing step to compensate for said error; and reprinting said image as a second print based on said adjustment step.

16. A method according to claim 15, comprising the further step of printing subsequent images in accordance with adjustments made in said adjusting step.

17. A method of inspecting a print, the method comprising the steps of:

digitally processing first digital image data representative of an original image to render said original image as a first print;

printing said original image as a latent image;

chemically developing said latent image to provide for a first print;

scanning said first print using a scanner to convert the original image on said first print to second digital image data;

comparing said second digital image data to said first digital image data;

identifying differences between the second digital image data and the first digital image data which exceed a predetermined threshold representative of an error in said chemical development step;

adjusting said chemical development step to compensate for said error; and reprinting said image as a second print based on said adjustment step.

18. A method according to claim 17, comprising the further step of printing subsequent images in accordance with adjustments made in said adjusting step.

* * * * *

UNITED STATES PATENT AND TRADEMARK OFFICE
CERTIFICATE OF CORRECTION

PATENT NO.         : 7,742,193 B2                                  Page 1 of 1
APPLICATION NO.    : 11/536997
DATED              : June 22, 2010
INVENTOR(S)        : Thomas F. Kaltenbach et al.

It is certified that error appears in the above-identified patent and that said Letters Patent is hereby corrected as shown below:

| Column | Line  |                                                                          |
|--------|-------|--------------------------------------------------------------------------|
| 1      | 9-10  | Delete "7,316,191," and insert -- 7,136,191, --, therefor.               |
| 11     | 23    | In Claim 13, delete "original," and insert -- original --, therefor.     |

Signed and Sealed this
Tenth Day of May, 2011

David J. Kappos
*Director of the United States Patent and Trademark Office*